US009153197B2

(12) United States Patent
Ahn

(10) Patent No.: US 9,153,197 B2
(45) Date of Patent: Oct. 6, 2015

(54) STORAGE APPARATUS AND METHOD FOR EFFECTIVELY ADDRESSING DISPLAY MEMORY

(75) Inventor: Jeong-Keun Ahn, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 332 days.

(21) Appl. No.: 13/466,352

(22) Filed: May 8, 2012

(65) Prior Publication Data

US 2013/0194285 A1 Aug. 1, 2013

(30) Foreign Application Priority Data

Jan. 26, 2012 (KR) ........................ 10-2012-0007951

(51) Int. Cl.

| | |
|---|---|
| ***G09G 5/39*** | (2006.01) |
| ***G06F 5/10*** | (2006.01) |
| ***G09G 5/00*** | (2006.01) |
| ***G09G 5/36*** | (2006.01) |
| ***G09G 5/393*** | (2006.01) |
| ***G09G 5/395*** | (2006.01) |

(52) U.S. Cl.

CPC ................ *G09G 5/006* (2013.01); *G09G 5/363* (2013.01); *G09G 5/393* (2013.01); *G09G 5/395* (2013.01); *G09G 2320/0252* (2013.01); *G09G 2330/021* (2013.01); *G09G 2360/06* (2013.01)

(58) Field of Classification Search

CPC .................... G09G 231/02; G09G 2310/0202; G09G 5/39; G06F 5/10

USPC .......................................... 345/531, 572, 571

See application file for complete search history.

(56) References Cited

U.S. PATENT DOCUMENTS

| | | | | |
|---|---|---|---|---|
| 6,222,512 | B1 * | 4/2001 | Tajima et al. | 345/63 |
| 6,356,988 | B1 * | 3/2002 | Takizawa | 711/202 |
| 7,057,962 | B1 * | 6/2006 | Tan et al. | 365/230.05 |
| 2003/0214512 | A1 * | 11/2003 | Cheng | 345/611 |
| 2005/0068327 | A1 * | 3/2005 | Tsumura et al. | 345/564 |
| 2009/0135209 | A1 * | 5/2009 | Takahashi | 345/690 |
| 2013/0212353 | A1 * | 8/2013 | Mimar | 712/4 |

FOREIGN PATENT DOCUMENTS

| | | | |
|---|---|---|---|
| KR | 10-0243477 | B1 | 11/1999 |
| KR | 10-2006-0093178 | A1 | 8/2006 |
| KR | 10-2010-0072628 | A1 | 7/2010 |

* cited by examiner

*Primary Examiner* — Stephen R Koziol
*Assistant Examiner* — Shivang Patel
(74) *Attorney, Agent, or Firm* — Lee & Morse, P.C.

(57) ABSTRACT

There is provided a storage apparatus for providing an effective memory addressing method. The storage apparatus includes at least one memory and at least one controller coupled to the at least one memory to provide address information. Each of the controllers includes a first controller for providing on/off information of subfields included in one frame for driving pixels in a display panel, a third controller for horizontal position information corresponding to a selected scan line from scan lines of a display panel, and a second controller for providing vertical position information corresponding to a pixel on the selected scan line. On/off information of subfields for at least two pixels is stored in a cell located at the vertical position and the horizontal position in the at least one memory.

14 Claims, 3 Drawing Sheets

STORAGE APPARATUS AND METHOD FOR EFFECTIVELY ADDRESSING DISPLAY MEMORY

CROSS-REFERENCE TO RELATED APPLICATION

This application claims priority to and the benefit of Korean Patent Application No. 10-2012-0007951, filed on Jan. 26, 2012, in the Korean Intellectual Property Office, the entire content of which is incorporated herein by reference.

BACKGROUND

1. Field

Embodiments relate to a storage apparatus and a method of controlling the same, and more particularly, to a storage apparatus for providing an effective memory addressing method and a method of controlling the same.

2. Description of the Related Art

Among flat panel displays (FPD), an organic light emitting display displays an image using organic light emitting diodes (OLED) that generate light by recombination of electrons and holes. The organic light emitting display has high response speed and is driven with low power consumption.

In general, the FPDs are driven by an analog method or a digital method. In the analog driving method, gray levels are realized by a voltage difference. In the digital driving method, gray levels are realized by a time difference.

In the analog driving method, different voltages are applied to pixels to realize the gray levels. In the analog driving method, data including gray level information is stored in a cell of a memory to correspond to the pixels.

In the digital driving method, the emission and non-emission, i.e., the display period of each of the pixels, is controlled to realize the gray levels. In the digital driving method, data including on/off information of the pixels is stored in the cell of the memory.

SUMMARY

Embodiments are directed to a storage apparatus, including at least one memory and controllers coupled to the memories to provide address information. Each of the controllers includes a third controller for providing line information corresponding to scan lines of a panel, a second controller for providing vertical position information of a line selected from the third controller, and a first controller for providing on/off information items of subfields included in one frame of pixels included in the panel.

The number n of outputs of the first controller is determined as "$2^n$=a minimum value of no less than a bit of data for determining gray levels. The number of outputs of the second controller is determined as "(a number of channels of a drive integrated circuit (IC)÷(a number of cell bits×3))×a number of drive ICs coupled to a memory)". The number of cell bits means a number of bits assigned to sub pixels in a cell of a memory. The number n of outputs of the third controller is determined as "$2^n$=a minimum value of no less than scan lines of a panel". The on/off information items of subfields corresponding to no less than four pixels are stored in a cell of the memory. The storage apparatus further includes multiplexers included in the controllers to selectively couple the first controller to the third controller to the memory to correspond to a control signal. The memory selects a memory cell to correspond to control of the second controller and the third controller and the on/off information items of the subfields are sequentially stored in the selected memory cell.

There is provided a method of controlling a storage apparatus, including (a) providing second position information corresponding to scan lines of a panel and first position information that is vertical position information of a line selected by the second position information to select a memory cell and (b) storing on/off information items of subfields of pixels in the memory cell selected in the step (a). The on/off information items of subfields corresponding to no less than four pixels are stored in the memory cell.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2012-0007951, filed on Jan. 26, 2012, in the Korean Intellectual Property Office, and entitled: "Storage Apparatus and Controlling Method Thereof" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
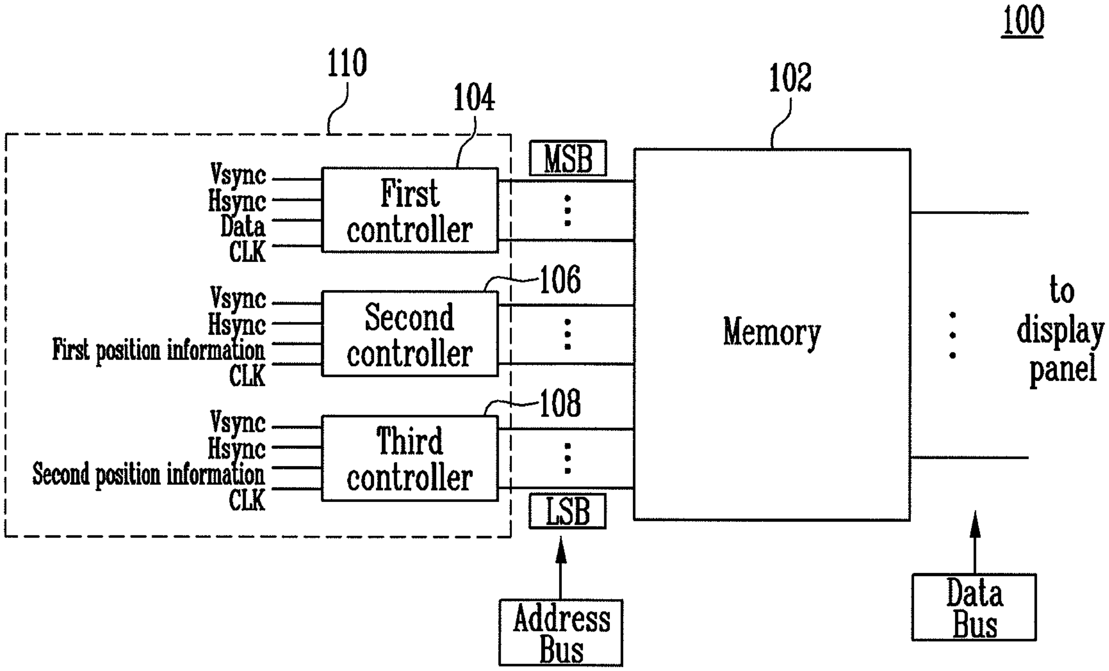
FIG. 1 is a view illustrating a storage apparatus according to an embodiment.

FIG. 1 is a view illustrating a storage apparatus according to an embodiment. Referring to FIG. 1, a storage apparatus 100 according to the present embodiment includes a memory 102 and a controller 110. Information from the controller 110 is supplied to the memory 102 over an address bus and information from the memory 102 is supplied to the display (not shown) over a data bus.

The memory 102 stores the on/off information for subfields provided from a first controller 104 to correspond to address information provided by a second controller 106 and a third controller 108. The outputs of the first controller 104 to the third controller 108 may be used as the address of the memory.

The controller 110 outputs address information for accessing the memory 102 and the on/off information of the subfields. The controller 110 includes the first controller 104, the second controller 106, and the third controller 108.

The first controller 104 receives a vertical synchronizing signal Vsync, a horizontal synchronizing signal Hsync, and a clock signal CLK from the outside, for example, from a timing controller (not shown). In addition, the first controller 104 receives data Data including the on/off information of the subfields.

In detail, in the digital driving method, one frame is divided into a plurality of subfields having the same and/or different times and gray levels are realized to correspond to whether pixels emit light during the subfields. The light emission information of the subfields is included in the data Data supplied to the first controller 104.

When the number of gray levels to be displayed by the display panel is, e.g., 1,024, the data Data is determined to be 10 bit, i.e., the data Data is m-bit, where $2^{min(m)}$≥the number of gray levels to be displayed and m is the minimum required to satisfy this relationship. The number of output channels n is determined by the relationship $2^{min(m)}$≥the number of bits m of data Data, i.e., a minimum number of output channels n that satisfies the relationship. When data Data is 10 bit, the number of output channels of the first controller 104 is 4.

When one frame includes ten subfields and the data Data is 10 bit, each of the bits represents whether each of the subfields emits light. For example, a first subfield is set to emit light when the least significant bit (LSB) of the data Data is set as "1" and a tenth subfield is set not to emit light when the most significant bit (MSB) of the data Data is set as "0". The first controller 104 determines the emission information of the subfields of a pixel using the data Data and supplies the determined emission information items to the memory 102 via the n output channels. For example, when "0001" is supplied from the first controller 104, the memory 102 stores the emission information of the subfields so that a corresponding pixel emits light only in a first subfield. Embodiments may be used in connection with any manner of dividing frames into subfields, e.g., in which one frame is divided into a plurality of subfields with a specific weight value.

The third controller 108 receives the vertical synchronizing signal Vsync, the horizontal synchronizing signal Hsync, and the clock signal CLK from the outside. In addition, the third controller 108 receives second position information from the outside. The second position information is line information corresponding to the scan lines of the panel. For example, when the display panel has 1,024 scan lines a number q of output channels of the third controller 108 is determined by the relationship $2^{min(q)}$≥the number of scan lines, i.e., a minimum number of output channels q that satisfies the relationship. Here, the third controller 108 has 10 output channels.

The second controller 106 receives the vertical synchronizing signal Vsync, the horizontal synchronizing signal Hsync, and the clock signal CLK from the outside. In addition, the second controller 106 receives first position information from the outside. The first position information is the vertical position of a pixel, i.e., one of the plurality of pixels for which on/off information of the subfields is to be stored in a cell of the memory 102. That is, the cell may be positioned in the memory at a position according to second position information that is a specific scan line or horizontal location of pixels in the display panel for which on/off information of the subfields is to be stored and the first position information is a vertical location of a pixel on the scan line in the display panel for which on/off information of the subfields is to be stored.

The number of output channels of the second controller 106 is determined as follows. First, a number of sub-pixels in a pixel, e.g., three sub-pixels (corresponding to R, G, and B sub-pixels), is multiplied by the number of cell bits of the memory 102. The number of cell bits is the number of bits assigned to each of the sub pixels in a cell. For example, when the cell is set as 30 bit, the number of cell bits is set as 10 bit so that the value of 30 is obtained. In other words, for each pixel, the number of sub-pixels, e.g., 3, is multiplied by the m-bit data Data, e.g., 10, to determine the number of bits for each cell.

Then, the number of channels of the driver integrated circuit (hereinafter, referred to as "IC") of the display panel is divided by 30. For example, when the driver IC has 720 channels, 24 memory cells are required in order to store the data supplied from the memory 102 to the driver IC having the 720 channels. Then, the number of driver ICs coupled to (or in charge of) the memory 102 is multiplied by this value, e.g., 24. In practice, the memory 102 and the driver ICs do not need to physically contact each other, but may transmit the data through a controller (not shown). For convenience sake, the memory 102 and the driver ICs are shown as being in contact with each other.

For example, when two driver ICs contact the memory 102, 24×2=48 is obtained. In this case, the number p of output channels of the second controller 106 is determined by the relationship $2^{min(p)}$≥the total number of memory cells needed, i.e., a minimum number of output channels p that satisfies the relationship. Here, the second controller 106 has 6 output channels.

Figure 2:
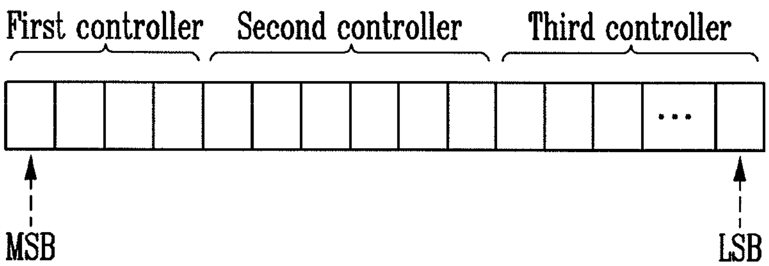
FIG. 2 is a view illustrating an example of address information output from the controller of FIG. 1.

The outputs of the first controller 104 to the third controller 108 are supplied to the memory 102 as addresses including one MSB and one LSB as illustrated in FIG. 2. In this case, the memory 102 stores the on/off information of the subfields to correspond to address information.

Figure 3:
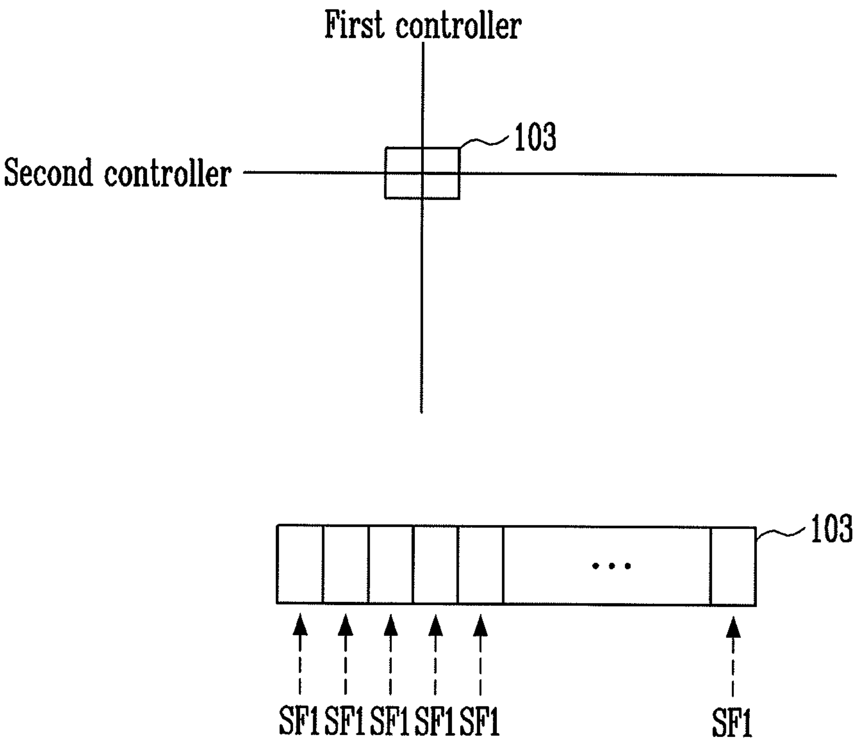
FIG. 3 is a view conceptually illustrating information stored in a memory to correspond to the position of a pixel in a display panel.

The information stored in the memory 102 to correspond to the position of the display panel will be conceptually described as follows. First, as illustrated in FIG. 3, the position of a cell 103 is determined in accordance with horizontal information output from the third controller 108 and vertical information output from the second controller 106. The on/off information items of the subfields of each pixel are sequentially stored in the cell 103 selected to correspond to the output of the first controller 104.

The on/off information items of the subfields may be variously set to correspond to the digital driving method. For example, from information on a first subfield SF1 to information on the last subfield in each pixel may be sequentially stored.

Since the subfield on/off information is bit information of "0" or "1", the subfield on/off information corresponding to 30 pixels is stored in one cell 103. Then, the on/off information items of all of the subfields are stored in each pixel in the memory 102 to correspond to the outputs of the first controller 104 to the third controller 108 and the stored information is managed as the address of the memory 102.

The gray level information items of a plurality of pixels, e.g., at least two up to the size of the cell. In accordance with the particular example noted above, at least four and up to ten pixels may be stored in the cell 103 of the memory 102 according to the present embodiment. In other words, data for a plurality of pixels may be stored in a cell 103, allowing three-dimensional mapping to be realized. Therefore, memory 102 may be efficiently used during digital driving.

According to the embodiment, a method of mapping the address of the memory may be variously set as illustrated in the following TABLE 1.

TABLE 1

| | Mapping 1 | Mapping 2 | Mapping 3 | Mapping 4 | Mapping 5 | Mapping 6 |
|---|---|---|---|---|---|---|
| MSB | Bit | bit | First position information | First position information | Second position information | Second position information |

TABLE 1-continued

| | Mapping 1 | Mapping 2 | Mapping 3 | Mapping 4 | Mapping 5 | Mapping 6 |
|---|---|---|---|---|---|---|
| | First position information | Second position information | bit | Second position information | bit | First position information |
| LSB | Second position information | First position information | Second position information | bit | First position information | Bit |

In TABLE 1, bit is the output of the first controller 104, the first position information is the output of the second controller 106, and the second position information is the output of the third controller 108. That is, according to the present embodiment, the outputs of the first controller 104 to the third controller 108 are combined with each other in various forms to be used as the address information of the memory 102. The cell 103 of the memory is selected using the first position information and the second position information to correspond to the previously determined mapping information. The on/off information of the subfields may be sequentially extracted from the selected cell or may be sequentially stored in the selected cell.

Figure 4:
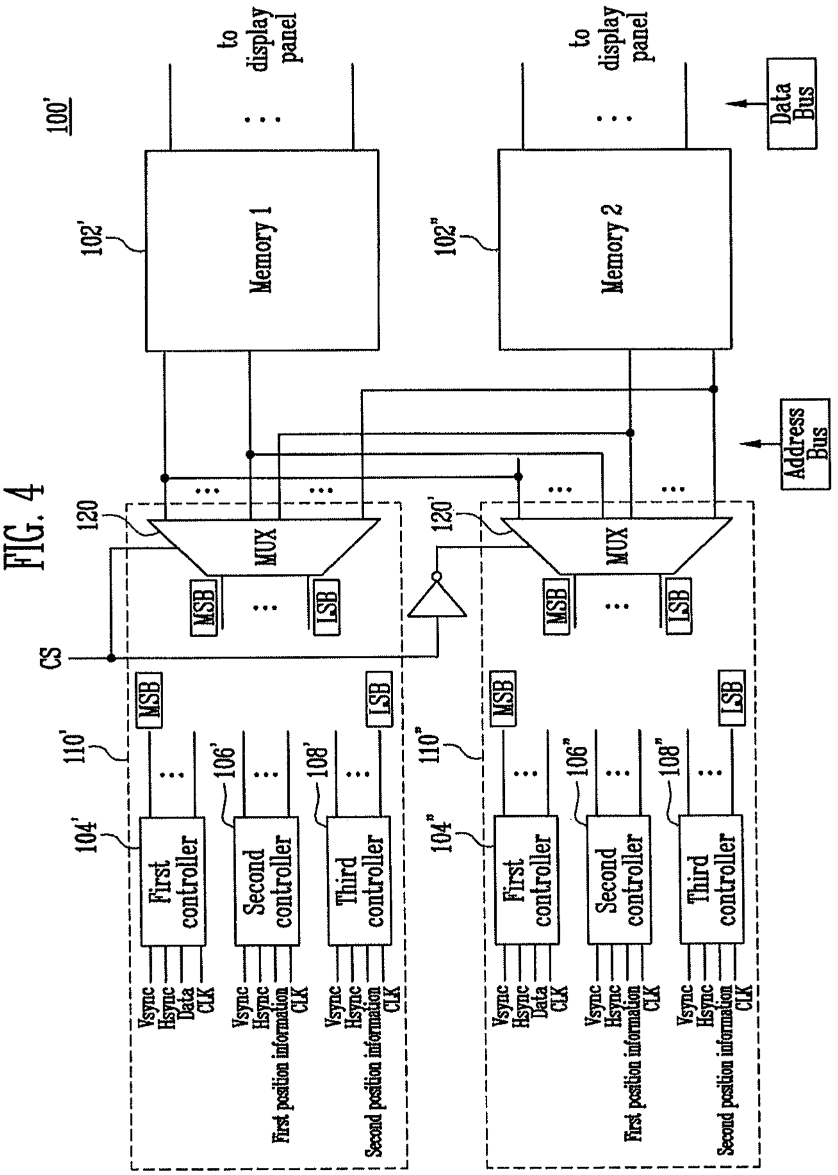
FIG. 4 is a view illustrating a storage apparatus according to an embodiment.

FIG. 4 is a view illustrating a storage apparatus according to another embodiment. When FIG. 4 is described, detailed description of the same elements as those of FIG. 1 will not be repeated.

Referring to FIG. 4, a storage apparatus 100' according to another embodiment includes two memories 102' and 102" and controllers 110' and 110" corresponding to the memories 102' and 102".

The controllers 110' and 110" include first controllers 104' and 104", second controllers 106' and 106", and third controllers 108' and 108". The operations of the first controllers 104' and 104", the second controllers 106' and 106", and the third controllers 108' and 108" are the same as illustrated in FIG. 1 and detailed description thereof will be omitted.

On the other hand, the controllers 110' and 110" according to the present embodiment further include multiplexers (hereinafter, referred to as Mux) 120 and 120'. The multiplexers 120 and 120' control the coupling of the controllers 110' and 110" and the memories 102' and 102" in response to a control signal CS supplied from the outside.

For example, when the first control signal is supplied, the first Mux 120 couples the first controller 110' to the first memory 102'. At this time, the second Mux 120' does not couple the second controller 110" to the second memory 102". Then, the first memory 102' performs a write operation corresponding to the first controller 110' and the second memory 102" performs a read operation. That is, in the present embodiment, the first memory 102' and the second memory 102" are provided and the Muxes 120 and 120' are provided so that the read/write operations are alternately repeated. Detailed operation processes are the same as those of FIG. 1.

When it is assumed that the cell of the memory is 30 bit and that the data is 10 bit, in the analog driving method, 30 bit is stored in the cell to correspond to three sub pixels. On the other hand, in the digital driving method, the on/off information (that is, “0” or “1”) of each of the three sub pixels, that is, 3 bit is stored in the cell. Therefore, in the digital driving method, it is difficult to effectively utilize the bit of the memory so that manufacturing cost increases.

However, in the storage apparatus according to embodiments and the method of driving the same, in the digital driving method, the on/off information of a plurality of pixels may be stored in the cell of the memory. When the on/off information of the plurality of pixels is stored in the cell of the memory, the utilization of the memory may be increased and manufacturing cost may be reduced.

While the above has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A storage apparatus, comprising:

at least one memory; and at least one processor coupled to the at least one memory to provide address information, wherein the at least one processor includes:

a display panel processor to provide on/off information of subfields included in one frame for driving pixels or sub pixels in a display panel;

a scan line processor to provide horizontal position information corresponding to selected scan lines of the display panel; and a pixel position processor to provide vertical position information corresponding to pixels or subpixels on the selected scan lines, wherein:

the on/off information from the display panel processor, the horizontal position information from the scan line processor, and the vertical position information from the pixel position processor are combined to form bits of a digital address, the at least one processor outputs the digital address to the at least one memory through respective lines or channels of an address bus, and on/off information of subfields for at least two pixels or sub-pixels is stored in a cell corresponding to the vertical position information and the horizontal position information in the at least one memory, on/off information including a plurality of bits, each bit indicative of an on/off state of a corresponding one of the subfields, and wherein:

a number p of outputs of the pixel position processor satisfies a relationship $2^{min(p)}$≥a total number of memory cells to store data, and a number of cells to store gray level data is based on the following equation: a number of channels of a drive integrated circuit (IC)÷(a number of cell bits per sub-pixel in a cell×a number of sub-pixels per pixel))×a number of drive ICs coupled to the at least one memory).

2. The storage apparatus as claimed in claim 1, wherein a number n of outputs of the display panel processor satisfies the relationship $2^{min(n)}$≥a number of bits to realize gray levels for the display panel.

3. The storage apparatus as claimed in claim 2, wherein a number q of outputs of the scan line processor satisfies the relationship $2^{min(q)}$≥a number of scan lines of the display panel.

4. The storage apparatus as claimed in claim 1, wherein on/off information of subfields corresponding to at least four pixels or sub pixels are stored in a cell of the memory.

5. The storage apparatus as claimed in claim 1, wherein the at least one processor includes two memories and the at least one processor includes two processors, and wherein the storage apparatus includes a plurality of multiplexers coupled between respective ones of the two processors and the two memories, each of the multiplexers selectively coupling the display panel processor to the scan line processor to the two memories in accordance with a control signal.

6. The storage apparatus as claimed in claim 1, wherein the memory selects a memory cell to correspond to control of the pixel position processor and the scan line processor and the on/off information of the subfields are sequentially stored in the selected memory cell.

7. A method of controlling a storage apparatus, comprising:

(a) providing horizontal position information computed by a display panel processor corresponding to a selected scan line from scan lines of a display panel and vertical position information computed by a pixel position processor corresponding to a pixel along the selected scan line to select a memory cell;

(b) combining on/off information of subfields of at least two pixels in the memory cell with the horizontal position information and the vertical position information to form a digital memory address; and (c) storing the on/off information of the subfields of the at least two pixels in the memory cell based on the vertical position information and horizontal position information in the digital memory address, the storing including outputting the on/off information through one or more respective lines or channels of an address bus, wherein the on/off information including a plurality of bits, each bit indicative of an on/off state of a corresponding one of the sub-fields, wherein a number p of outputs of the pixel position processor satisfies a relationship $2^{min(p)}\geq$a total number of memory cells to store data, and a number of cells to store gray level data is based on the following equation: a number of channels of a drive integrated circuit (IC)÷(a number of cell bits per sub-pixel in a cell×a number of sub-pixels per pixel))×a number of drive ICs coupled to the at least one memory).

8. The method as claimed in claim 7, wherein on/off information of subfields corresponding to at least four pixels are stored in the memory cell.

9. An apparatus, comprising:

a display panel processor to output on/off information of subfields included in one frame for driving pixels or sub pixels in a display panel;

a scan line selector to provide horizontal position information to select scan lines of the display panel; and a pixel position selector to provide vertical position information corresponding to pixels on the selected scan lines, wherein the on/off information, the horizontal position information, and the vertical position information are combined to form bits of a digital address to be output to at least one memory through respective lines or channels of an address bus, wherein the on/off information includes a plurality of bits, each bit indicative of an on/off state of a corresponding one of the sub-fields, and wherein:

a number p of outputs of the pixel position selector satisfies a relationship $2^{min(p)}\geq$a total number of cells in the at least one memory to store data for the display panel, and the number of cells to store the data for the display panel is based on the following equation: a number of channels of a drive integrated circuit (IC)÷(a number of cell bits per sub-pixel in a cell×a number of sub-pixels per pixel))×a number of drive ICs coupled to the at least one memory).

10. The apparatus as claimed in claim 9, wherein the on/off information is between the horizontal position information and the vertical position information in the digital address.

11. The apparatus as claimed in claim 9, wherein the on/off information is located before the horizontal position information and the vertical position information in the digital address.

12. The apparatus as claimed in claim 9, wherein the on/off information is located after the horizontal position information and the vertical position information in the digital address.

13. The apparatus as claimed in claim 9, wherein a number n of outputs of the display panel controller satisfies a relationship $2^{min(n)}\geq$a number of bits to realize gray levels for the display panel.

14. The apparatus as claimed in claim 9, wherein a number q of outputs of the scan line selector satisfies a relationship $2^{min(q)}\geq$a number of scan lines of the display panel.

* * * * *